(12) United States Patent
Lee

(10) Patent No.: US 6,907,987 B2
(45) Date of Patent: Jun. 21, 2005

(54) SECURITY TAPE DISC STORAGE CASE

(76) Inventor: Ching Mou Lee, Shenzhen Kolor Magnetic Co., Ltd., 128 Industrial Zone, Henggang, Shenzhen, Guangdong, 518173 (CN)

( * ) Notice: Subject to any disclaimer, the term of this patent is extended or adjusted under 35 U.S.C. 154(b) by 209 days.

(21) Appl. No.: 10/302,542

(22) Filed: Nov. 22, 2002

(65) Prior Publication Data

US 2003/0146119 A1 Aug. 7, 2003

(30) Foreign Application Priority Data

Feb. 4, 2002 (CN) ........................................ 02225693 U

(51) Int. Cl.$^7$ .............................................. B65D 85/30
(52) U.S. Cl. .................................... 206/308.2; 206/1.5
(58) Field of Search ..................... 206/308.2, 308.1, 206/1.5, 310, 807, 309, 387.11, 472, 57.1, 63, 58; 70/57.1, 63, 58

(56) References Cited

U.S. PATENT DOCUMENTS 3,767,110 A * 10/1973 Congleton .................. 220/4.23
5,322,178 A * 6/1994 Foos .......................... 220/326

* cited by examiner

*Primary Examiner*—Shian T. Luong
(74) *Attorney, Agent, or Firm*—Michael L. Diaz

(57) ABSTRACT

This invention relates to a security type disc storage case, including case cover, case back, and case bottom, which are connected by a folding V-shaped trough, characterized in that a security board, through which it can be judged that whether the disc storage case is once opened, is set at the outer side of the case cover. After the disc storage case is packed, the security board, case cover, and case bottom are connected together, which means the case is never opened. After purchasing the disc stored in such a case, the consumer can tear part of the security board, then the case cover can be opened freely, and the disc inside can be taken out or put in conveniently.

9 Claims, 6 Drawing Sheets

SECURITY TAPE DISC STORAGE CASE

BACKGROUND OF THE INVENTION

1. Field of the Invention

The present invention relates to a kind of disc storage case with a self-locking security structure at the opening position. The case described herein can help protect the legal rights and interests of the disc issuers and enhancing the consumers' ability in identifying the authorized discs, so as to prevent pilferage and distinguish originals from fakes.

2. Description of the Related Art

A disc storage case is usually composed of a case bottom, a case back, and case cover. The main function is for storing discs and protecting the disc from being damaged. Currently, most disc cases in the market do not have a security structure, thus it can be opened easily without damaging the case in any link of the distribution, and the disc may easily be subjected to theft and secret substitution. As a result, the issuers can hardly protect their legal rights and interests and the customers have difficulty in determining the genuineness of the discs, either.

SUMMARY OF THE INVENTION

The object of the present invention is to provide a kind of disc storage case with a security sign. When the case is opened for the first time, the sign will be damaged, so that the disc can't be stolen or changed by the lawbreakers during the course of distribution.

BRIEF DESCRIPTION OF THE DRAWINGS

The present invention will become fully understood from the detailed description given herein below illustration only, and thus are not limitative of the present invention, and wherein.

DESCRIPTION OF THE INVENTION

Figure 1:
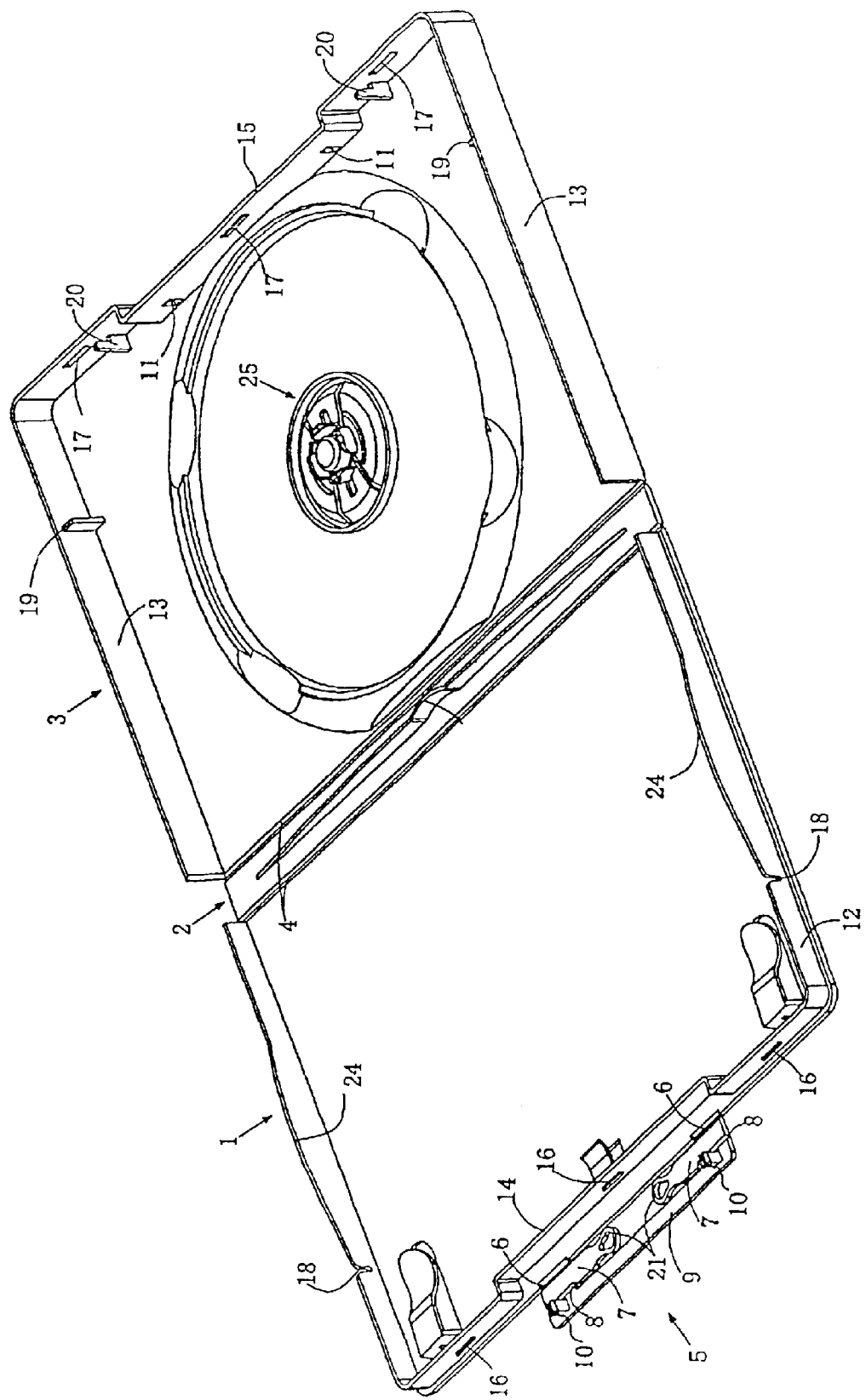
FIG. 1 shows the open state of the disc storage case of the present invention before packing.

FIG. 1 shows a typical embodiment of disc storage case of the present invention, including case cover 1, case back 2, and case bottom 3, which are connected by the folding V-shaped trough 4. In addition, a security board 5, through which it can be judged whether the disc storage case is ever opened or not, is set at the outer side of the case cover 1.

Figure 2:
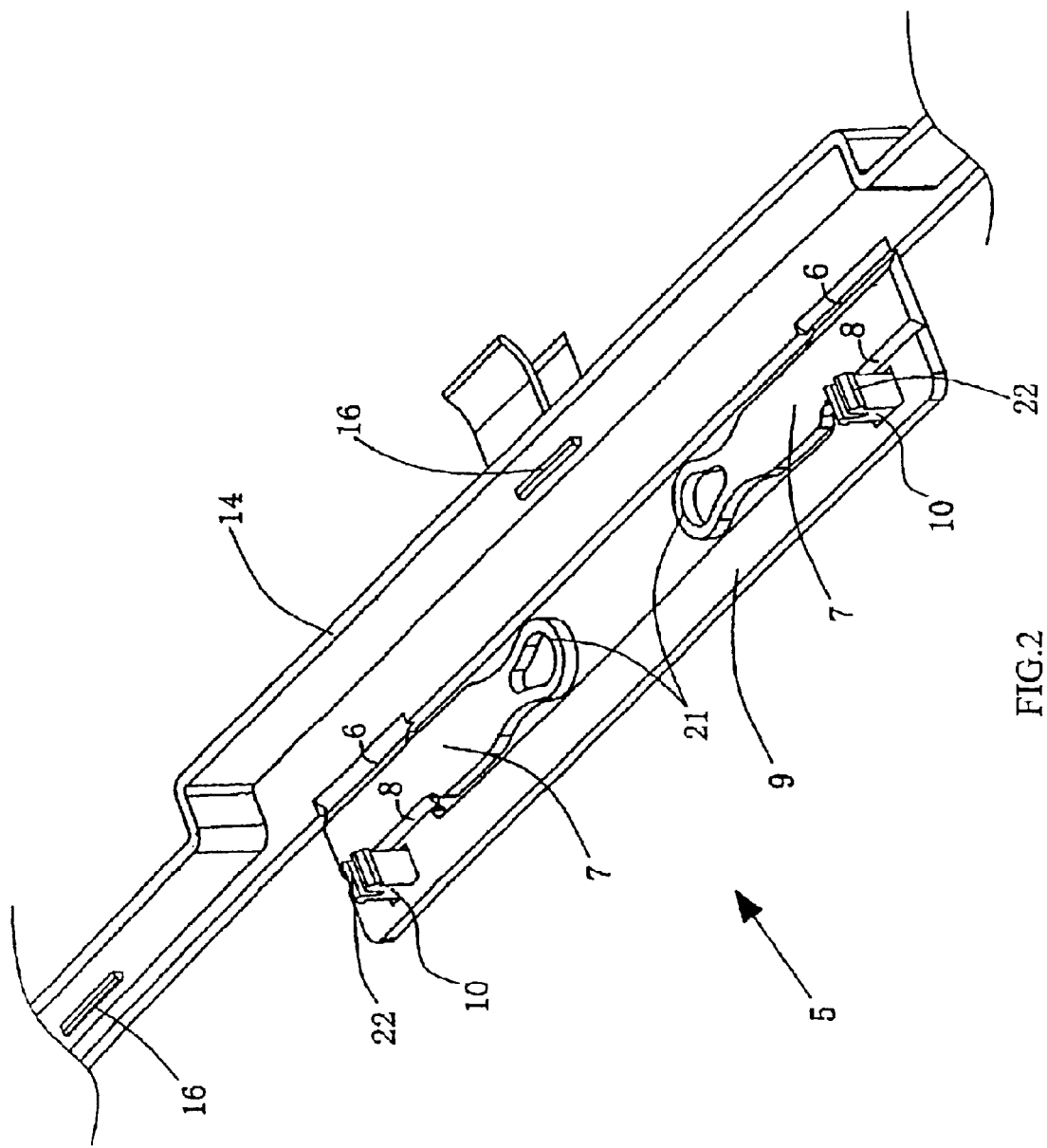
FIG. 2 shows the security board in the present invention.
Figure 3:
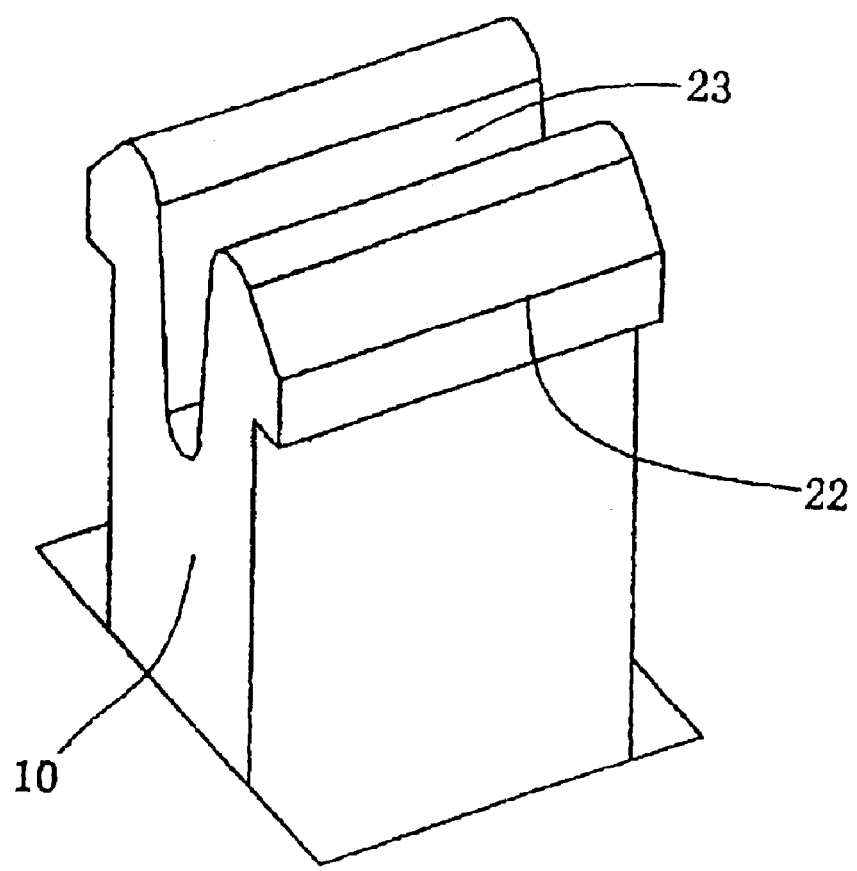
FIG. 3 shows the locking pin in FIG. 2.

As shown in FIG. 2, security board 5 includes handle 7 that is connected to the outer side of the case cover 1 by the folding V-shaped trough 6 and locking board 9 that is connected to the handle 7 by the folding V-shaped trough 8. An anti-withdrawal locking pin 10 is set on the locking board 9. At the end of the handle 7 is the handle hole 21. As shown in FIG. 3, at the end of the locking pin 10 is the arrow cone 22, on the top of which is the flute 23. As shown in FIG. 1, at the outer side of the case bottom 3 is the locking jack 11 corresponding to the locking pin 10. The horizontal dimension of the arrow cone 22 is greater than that of the jack 11.

As shown in FIG. 1, on both ends and outer side of case cover 1 is the vertical side 12, which is vertical to the case cover 1. On both ends as well as the outer side of the case bottom 3 is the vertical side 13 which is vertical to case bottom 3 and corresponds to the vertical side 12 of case cover 1. The section of the vertical side 12 of case cover 1 corresponding to the security board 5 is the inward concave section 14. On the vertical side 13 of the case bottom 3 is the concave section 15 corresponding to the concave section 14. Locking jack 11 lies at the side near the bottom of the concave section 15. The concave width of the concave section 15 of the case bottom 3 is slightly smaller than that of the concave section 14 of the case cover 1, thus when case cover and case bottom are engaged, the concave section 15 of the case bottom lies outside, and the concave section 14 of the case cover lies inside. The purpose of setting concave sections 14 and 15 is that before the formal packing, the security board 5 and the locking pin 10 and some other structures which are located on the security board 5 can be received in the concave, so that the security board 5 can be turned to the position parallel to the vertical side 12, and the packaging size of the storage case before formal packing can be reduced. Additionally, it can avoid the damage of the security board and error self-locking during the course of packaging and transportation of the empty cases. On the vertical side 12 are several raised bars 16 for orientation, and on the vertical side 13 are several flutes 17 corresponding to the raised bars 16. When the case cover and bottom are engaged, the raised bars 16 penetrate into the flutes 17, thus the case cover can be fixed.

As shown in FIG. 1, when case cover 1 and case bottom 3 are engaged, the vertical side 12 of the case cover 1 lies inside, and the vertical side 13 of the case bottom 3 lies outside. On the vertical side on the both ends of the case cover 1 is the flute 18 for positioning, and on the inner side of the vertical side on both ends of the case bottom 3 is the protruding slice 19 corresponding to the flute 18. The height of the vertical side 12 of the case cover 1 is smaller than that of the vertical side 13 of the case bottom 3. On the inner side of the vertical side of the case bottom 3 is the rigid supporting base 20 for bearing the case cover 1. The central part 24 of the vertical side on both ends of the case cover 1 is of an arc protruding shape, which not only looks handsome, but also increases the strength of the central part of the case end. Thus the case cover can't be pried up from the middle part, and the disc won't be stolen or changed.

Resorting to the attached drawings, the using procedure of the disc storage case of the present invention is described as follows:

1. Put into the Disc and Encapsulate the Disc Storage Case

Figure 4:
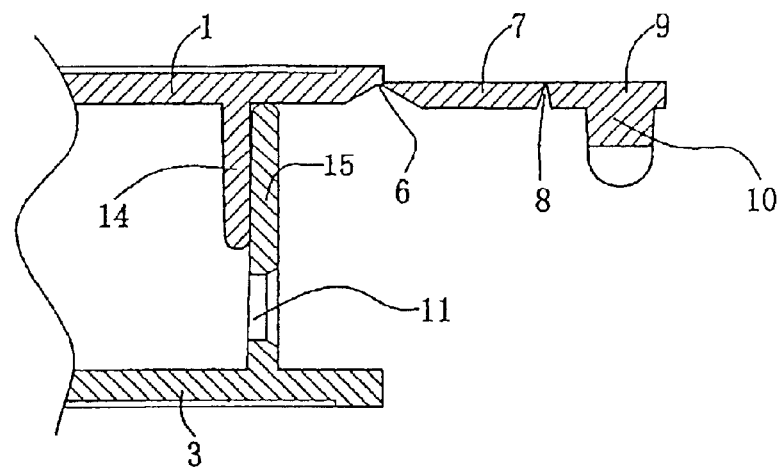
FIGS. 4, 5, and 6 show the locking course of the security board.
Figure 5:
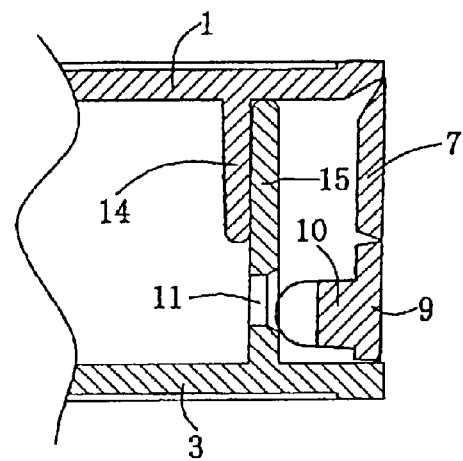
Figure 6:
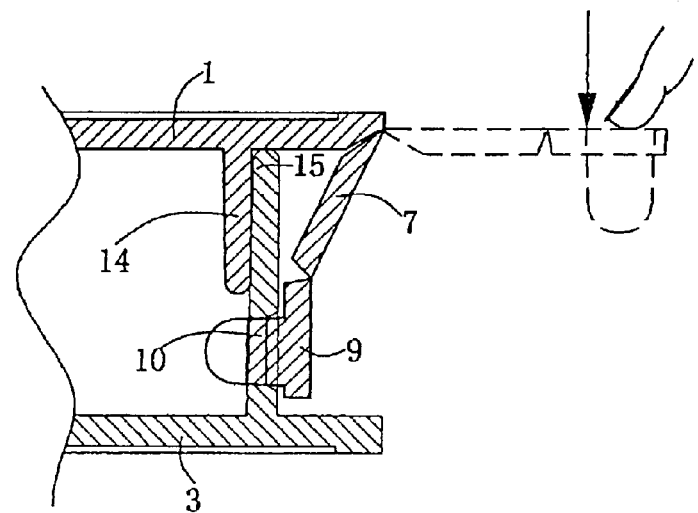

Firstly, open the disc storage case, lightly put the central hole of the disc to the disc supporting base 25 of the storage case as shown in FIG. 1, turn over the case cover 1, then the case cover 1 and the conjoined security board 5 gradually shift towards the case bottom 3. The arc heave 24 on both ends of the case cover 1 contacts the vertical side 13 at the end of the case bottom 3 and conducts radial guiding, when the positioning flute 18 on the case cover 1 touches the positioning protruding slice 19 on the case bottom 3, the case cover 1 is to be axially positioned. When the axial positioning here is to be finished, with the case cover 1 shifted more, the vertical side at the outer side of the case cover 1 touches the supporting base 20 at the inner side of the outer section of the case bottom 3. The case cover 1 is repositioned axially. When the case cover 1 and the case bottom 3 are closed completely, the protruding bar 16 on the case cover 1 joggles with the flute 17 on the inner side of the vertical side of the case bottom 3, at which point the disc storage case is completely closed. Next, the security board 5 is turned back downwardly. The handle 7, locking board 9, and the locking pin 10 on it are shifted downwardly. When the arrow cone 22 on the top of the locking pin 10 reaches the locking jack 11 on the case bottom 3, it enters the guiding positioning state before locking. At this time, the security board 5 is received outside the concave section of the case cover 1 and case bottom 3. With the action of proper force, the locking jack 11 forces both limbs of the arrow cone 22 to deform towards the central flute 23. The arrow cone 22 gradually penetrate into the locking jack 11, then with the action of its own bounce, both limbs of the arrow cone 22 resume normal operations. It can't be withdrawn because it is blocked inside the locking jack 11. Thus the disc is put in and the packing is also accomplished (Refer to FIG. 4, FIG. 5, and FIG. 6). To guarantee that the locking pin 10 can insert into the locking jack 11 smoothly, the front of the locking jack 11 is designed into a bugle shape (Refer to FIG. 4).

2. Open the Disc Storage Case and Take out the Disc

Figure 7:
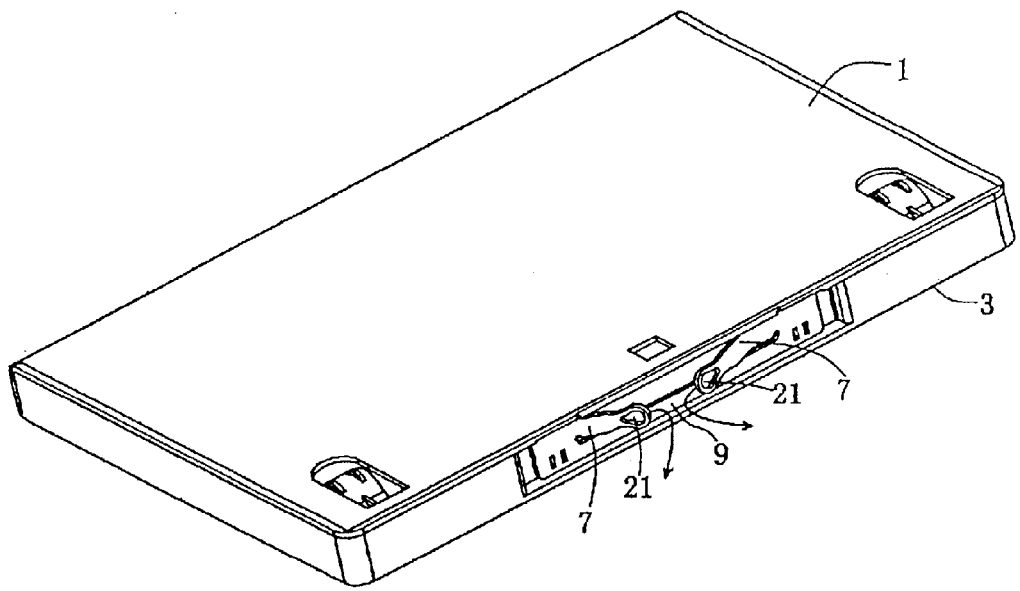
FIG. 7 shows the handle for tearing the security board.
Figure 8:
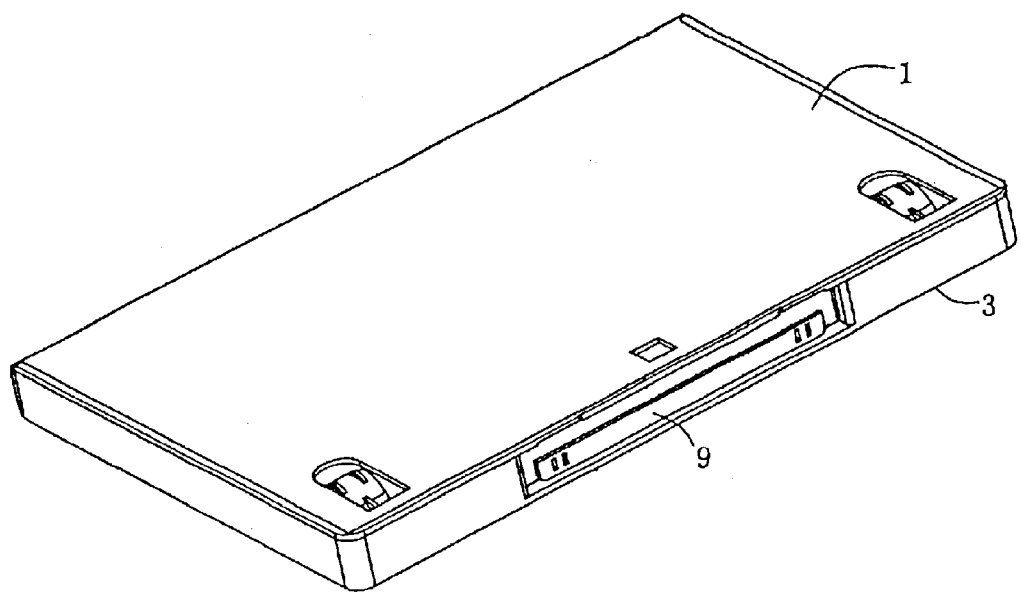
FIG. 8 shows the closing state of the case cover and case bottom after the security board is damaged.
Figure 9:
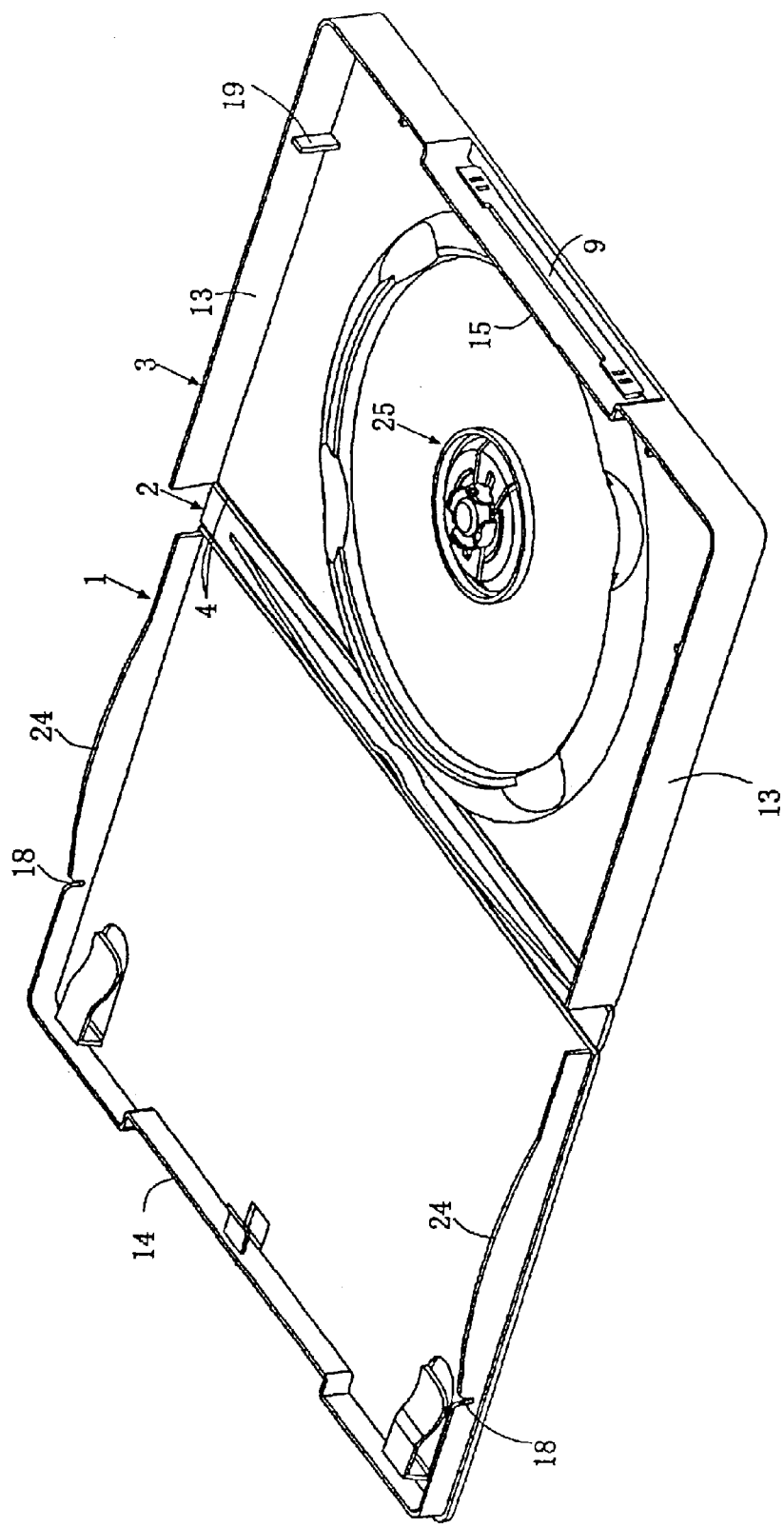
FIG. 9 shows the open state of the disc storage case of the present invention after the security board is damaged.

After purchasing the well-packed disc, the user can lightly raise the end of the handle 7 of the security board 5 with a finger, and then put the finger into the handle hole 21. Thus, the handle 7 can be torn along the V-shaped trough on both sides. Then the connection of the case cover 1 and the case bottom 3 at the position of the security board 5 is relieved, and the storage case is unlocked. The user can then open the case cover 1 and take out the disc in the case (Refer to FIG. 7, FIG. 8, and FIG. 9).

When the handle 7 is torn when opening the case, the security board 5 is damaged, and the disc storage case can't resume the state before it is unlocked. Therefore, the consumers needn't worry that the disc inside is once changed if the packaging is complete. Additionally, it is very convenient to deposit or take out the disc after the security board 5 is torn.

To ensure that the handle 7 can be torn by hand successfully, appropriative unsealing tools can be prepared, such as special cutting tool. If for the causes of material or technique, the strength of the V-shaped groove on both sides of the handle 7 is not weak enough that the handle can be torn easily, the consumer can use the special cutting tool to cut the V-shaped trough, and then tear it.

What is claimed is:

1. A security type disc storage case, comprising a case cover, a case back, and a case bottom, which are connected by a at least two folding V-shaped troughs, characterized in that a security board, through which it can be judged whether the disc storage case is once opened, is set at an outer side of the case cover;

wherein said security board includes at least one handle that is connected to the outer side of said case cover by a first folding V-shaved trough, and a locking board which is connected to said handle by a second folding V-shaped trough; and wherein the security board is damaged when opened to indicate that the storage case has been opened.

2. A disc storage case as claimed in claim 1, wherein anti-withdrawal locking pins are set on said locking board; and locking jacks corresponding to said locking pins are set on an outer side of said case bottom.

3. A disc storage case as claimed in claim 2, wherein a vertical side which is vertical to said case cover is set on both ends as well as the outer side of said case cover; and a vertical side which is vertical to the case bottom and corresponding to said vertical side of said case cover is set on both ends and outer side of said case bottom.

4. A disc storage case as claimed in claim 3, wherein the section of the vertical side of said case cover corresponding to the position of said security board is inward concave; and the section of the vertical side of said case bottom corresponding to the position of said security board is also inward concave; said locking jack lies at the side near the bottom of said case bottom.

5. A disc storage case as claimed in claim 3, wherein a plurality of raised bars for positioning are set on the vertical side of said case cover, and a plurality of flutes corresponding to said raised bars are set on the vertical side of said case bottom.

6. A disc storage case as claimed in claim 3, wherein the vertical side of said case cover lies inside when said case cover and case bottom are closed, and the vertical side of said case bottom lies outside; on the vertical side on both ends of said case cover there sets flutes for positioning, and on an inner side of the vertical side on both ends of said case bottom there sets some protruding slices corresponding to said flutes.

7. A disc storage case as claimed in claim 3, wherein the height of the vertical side of said case cover is less than that of the vertical side of said case bottom; supporting bases for supporting the vertical side of said case cover are set on an inner side of the vertical side on said case bottom, the central parts of the vertical side on both ends of the said case cover are of arc protruding shape.

8. A disc storage case as claimed in claim 2, wherein on an end of said locking pin is an arrow cone, and a flute is set on a top of said arrow cone; horizontal dimension of the bottom of said arrow cone is larger than that of said jack in the corresponding dimension.

9. A disc storage case as claimed in claim 1, wherein a handle hole is set on an end of said handle.

* * * * *